United States Patent [19]

Schultz

[11] 3,848,152
[45] Nov. 12, 1974

[54] ELECTRIC LAMP HAVING A FUSED SILICA GLASS ENVELOPE
[75] Inventor: Peter C. Schultz, Painted Post, N.Y.
[73] Assignee: Corning Glass Works, Corning, N.Y.
[22] Filed: June 6, 1972
[21] Appl. No.: 260,100

[52] U.S. Cl.................. 313/221, 106/52, 313/112
[51] Int. Cl. ............................................. H01j 5/04
[58] Field of Search .......... 313/221, 222, 184, 112; 106/52

[56] References Cited
UNITED STATES PATENTS

| | | | |
|---|---|---|---|
| 2,795,721 | 6/1957 | Reinker | 313/112 |
| 2,895,839 | 7/1959 | George | 106/52 |
| 3,253,174 | 5/1966 | Elmer et al. | 313/221 X |
| 3,573,939 | 4/1971 | Beall | 106/52 X |
| 3,581,137 | 5/1971 | Arnott et al. | 313/112 X |
| 3,644,607 | 2/1972 | Roques et al. | 106/52 X |

OTHER PUBLICATIONS
The Constitution of Glasses, A Dynamic Interpretation, Vol. II, part 1, W. A. Weyl and E. C. Marboe, Interscience Publishers, a division of John Wiley and Sons, New York   1964.

Primary Examiner—Ronald L. Wibert
Assistant Examiner—Richard A. Rosenberger
Attorney, Agent, or Firm—Clinton S. James, Jr.; Clarence R. Patty, Jr.

[57]   ABSTRACT

An electric lamp comprises a light source within a glass envelope adapted to operate at temperatures above 800°C. under pressures ranging up to 100 atmospheres. The lamp may be a tungsten halide incandescent type or a discharge type such as a mercury vapor or metal halide lamp. The envelope is composed of a fused silica glass containing, on a cation mole percent basis, 0.01–1.0% of an additive selected from the group consisting of $SnO_2$, $GeO_2$, $Fe_2O_3$, $WO_3$, $MoO_3$ and $Ta_2O_5$.

3 Claims, 5 Drawing Figures

ELECTRIC LAMP HAVING A FUSED SILICA GLASS ENVELOPE

This invention relates to high temperature type electric lamps that are adapted to operate at elevated temperatures in excess of 800°C and at pressures ranging up to 100 atmospheres. It is more particularly concerned with glass envelopes for such lamps wherein the envelope is composed of a fused silica glass containing an additive that markedly improves the characteristics of the glass for lamp purposes.

The term "fused silica glass" is used throughout the present specification and claims to designate a glass composed primarily of silica ($SiO_2$) and prepared by the flame hydrolysis technique. This technique of glass preparation, and numerous specific embodiments thereof, are described in detail in U.S. Pat. No. 2,326,059, granted Aug. 3, 1943 to M. E. Nordberg; U.S. Pat. No. 2,239,551, granted Apr. 22, 1941 to R. H. Dalton et al.; and a companion application Ser. No. 208,168, filed Dec. 15, 1971 under the title "Method of Producing Glass" and in the names of P. C. Schultz and F. W. Voorhees.

In general, the method comprises supplying, in vapor form, a hydrolyzable compound of silicon, alone or in admixture with a small amount of a similar compound of another glass forming oxide. The vapors are passed into a flame of combustible gas in a burner where they are hydrolized and decomposed to form oxides. Depending on the temperature of the flame, the oxides formed (primarily silica) may be deposited directly in the vitreous state, or may be deposited on a mandrel or other form as a dense, finely divided powder (known as a soot) which may subsequently be vitrified by heat treatment. The flame hydrolysis technique, as adapted to the production of pure silica glass, is described in U.S. Pat. No. 2,272,342, granted Feb. 10, 1942 to J. F. Hyde. Modifications thereof, concerned with the introduction of other oxides into the fused silica glass, are described in the other patents and applications mentioned earlier.

The high temperature type lamps with which the invention is concerned include the tungsten halide incandescent lamp as well as a variety of discharge lamps. The tungsten halide lamp employs a tungsten filament and introduces a halogen, such as iodine, within the lamp envelope to transport volatilized tungsten back to the filament. The discharge type lamps include the well-known mercury vapor and metal halide type lamps, the recently announced "molecular" lamp which employs chlorine as the discharge vehicle, and a short arc lamp in which the lamp atmosphere may be mercury, xenon gas, or a combination thereof.

It is conventional practice, in the fabrication of such high temperature lamps, to employ a lamp envelope composed of fused quartz. This material is a vitreous silica produced by melting natural rock quartz crystals either by vacuum or atmosphere melting.

Recent developments in the lamp industry, aimed at improved light output and lamp efficiency, impose severe requirements that exceed the capability of available silica glass materials. In particular, during the operation of certain types of lamps, it is desirable, for lamp efficiency purposes, to generate pressures within the lamp that approach 100 atmospheres. Further, the operation of such lamps with increased power input tends to increase the operating temperature of the envelope wall to a temperature where the wall tends to soften and deform under such high pressure.

Polycrystalline materials have been developed to meet this need for higher softening point materials. However, such materials are prohibitively expensive. They are also incapable of being lamp worked in the usual manner, and therefore present a variety of difficult sealing problems. Consequently, their primary use is in the very high temperature, caustic atmosphere lamps, such as the sodium vapor lamps.

Thus, there remains a need for a new improved lamp envelope for tungsten halide and discharge lamps to permit progress in this area of lamp development. This envelope should preferably be composed of a colorless glass material for light transmission purposes and be more refractory than present fused silicas at lamp operating tempratures. At the same time it should permit use of present lamp working and sealing practices. With respect to the latter, it would be particularly desirable to increase the lamp operating temperature without increasing the temperature to which the glass must be heated for sealing and working.

In particular, a glass envelope is needed that is capable of withstanding greater pressures at higher temperatures than the presently available fused quartz envelopes will withstand. Further, this glass envelope should be essentially inert to any reaction with the lamp atmosphere that will lead to either discoloration or devitrification of the glass. A primary purpose of the present invention then is to meet this need.

It is also known that certain temperature lamps tend to generate a substantial amount of ultraviolet radiation during operation. Such radiation not only fails to provide useful light, but also may be harmful to the human eye. Therefore, it is highly desirable to provide a lamp envelope that will absorb such radiation. At the same time, however, the cutoff, or change, between absorption in the ultraviolet portion of the radiation spectrum and the visible portion thereof should be such as to cause no substantial loss in visible light transmission. It would be particularly desirable for the envelope to not only absorb the undesired ultraviolet radiation, but also to convert it into radiation in the visible portion of the spectrum by fluorescing. A further purpose then is to provide a lamp envelope capable of absorbing ultraviolet radiation and enhancing lamp efficiency by reemitting this energy as visible radiation.

A primary cause of short lamp life in high temperature lamps is development of devitrification in the lamp envelope whereby a crystalline material of different expansion is produced. This usually occurs as a small spot on the lamp envelope within which a crack develops due to strains that develop as the lamp temperature fluctuates rapidly. It would be especially advantageous then to provide a lamp envelope in which this devitrification problem is minimized.

It has been proposed to produce high temperature lamp envelopes from high purity fused silica glass, that is glass produced by vapor phase or flame hydrolysis. However, the viscosity-temperature relationship has proven inadequate for the purpose. In particular, the strain point of the glass is too low to permit the desired high operating tempratures.

I have now discovered that the addition of certain selected oxides to fused silica glass in small amounts enables the glass to absorb ultraviolet radiation and enhance lamp efficiency. Such oxide addition also causes a substantial increase in the annealing point and strain point of the glass. Fortuitously, however, the upward shift in the temperature-viscosity relationship, that occurs in the vicinity of the strain point, diminishes with increasing temperature and is much less at and above the glass softening point. This steepening of the viscosity-temperature curve provides the desired increase in lamp operating temperature without correspondingly increasing the lamp working temperatures required for lamp fabrication.

Based on these and other discoveries, my invention is an electric lamp comprising a light source within a glass envelope, the glass envelope being adapted to operate at temperatures in the range of 800°–1150°C. under an internal pressure of up to 100 atmospheres, and being composed of a fused silica glass containing as an additive to its composition on a cationic mole percent basis, 0.01 to 1.0% of an oxide selected from the group consisting of $SnO_2$, $GeO_2$, $Fe_2O_3$, $WO_3$, $MoO_3$, and $Ta_2O_5$.

Glass batches are normally formulated on a weight basis, and oxide compositions are then calculated therefrom on a weight percent basis. Nevertheless, it is frequently necessary to use mole percent compositions in order to express a relationship between a series of glass compositions and their properties. Further, substitutions between additives such as alkali metal oxides, radiation absorbers and fining agents must often be made on an ionic or mole basis to avoid complications arising from the great disparity in atomic and molecular weights. Mole percent is conveniently used, except where cations of multiple valence are involved, e.g., iron, molybdenum, germanium and tantalum. Then cation percent compositions become preferable.

In terms of glass compositions, cation mole percent may be considered as identical to mole percent with all oxides expressed in terms of the simple empirical formula $RO_x$ where R is a single metallic atom or ion and $x$ is the number of oxygen atoms attached to each such metal atom or ion in the oxide state. The normally single cation metal oxides (e.g. $CaO$ or $SiO_2$) remain unchanged, but oxides such as $B_2O_3$ and $P_2O_5$ are written $BO_{1.5}$ and $PO_{2.5}$. The cation mole percent composition can be readily computed from the normal mole percent composition using molecular weights based on these revised oxide formulae. Thus, the basic purpose of using cation mole percent is to provide a method of accurately comparing amounts of oxides having different valences. It contemplates formula weights on the basis of a single cation.

As pointed out earlier, the term "fused silica glass" is used throughout the present specification and claims to designate a glass composed primarily of silica ($SiO_2$) and prepared by the flame hydrolysis technique. The oxide, or oxide mixture, prepared in this manner may be deposited directly in vitreous form, for example in the form of a boule, or it may be deposited on a support as a dense compact of particles and vitrified by subsequent heat treatment.

Glasses produced by the latter method, that is particle deposition followed by vitrification, have been found to have a much lower water content than the identical glass produced by direct glass deposition from the flame. Accordingly, the former is termed a "dry" glass, while the latter is a "wet" glass. The glass having a lower water content also has substantially higher strain and annealing temperatures, and a generally higher viscosity at any given temperature. In accordance with the present invention, the strain and annealing points of fused silica glass are substantially increased above normal values by the characteristics additives of the invention, regardless of which manner of production is employed, that is in both "wet" and "dry" glasses. This is further illustrated later.

The invention is further described with reference to the accompanying drawing wherein.

Figure 1:
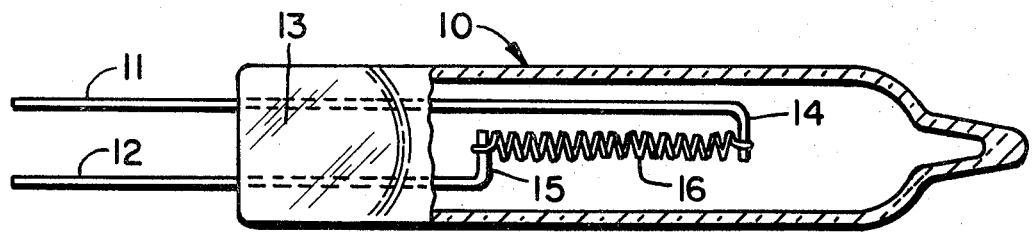
FIG. 1 illustrates a typical tungsten-iodine cycle lamp prepared according to the present invention.

FIG. 1 illustrates a side view, partly in section, of a typical tungsten-iodine cycle lamp comprising a glass envelope 10 having two tungsten lead wires 11 and 12 sealed therein by a hermetic glass-metal seal 13. Lead wires 11 and 12 extend within the glass envelope and have end portions 14 and 15 which serve as supports for a tungsten filament 16. This is preferably of the coiled-coil type and located concentrically within glass envelope 10. During fabrication of the lamp, envelope 10 is evacuated and filled with an inert gas, such as argon, containing traces of iodine vapor. The envelope is hermetically sealed, as at 13. During lamp operation, tungsten tends to evaporate from the filament and deposit on the lamp wall where it reacts with the iodine vapor and is returned as tungsten iodide to the filament.

Figure 2:
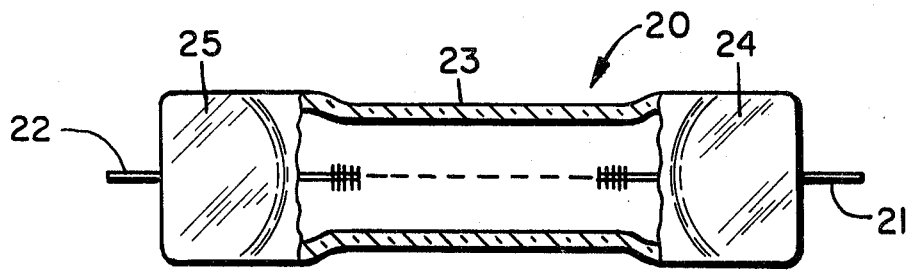
FIG. 2 likewise illustrates a typical discharge lamp.

FIG. 2 is a side view, partly in section, showing a typical discharge lamp in accordance with the invention. Lamp 20 includes discharge or arc electrodes 21 and 22 sealed within glass envelope 23 by glass-metal seals 24 and 25. Electrodes 21 and 22 may for example be tungsten rod or wire and may be provided with coil wound tips, with special metal tips, or with other structural characteristics known in the art. Graded seals, or other known sealing structures may be employed, but are not shown as they do not represent a feature of the invention. Heretofore, fused quartz envelopes have been used in this type lamp. The present invention provides an improved glass envelope for this type lamp, as well as the tungsten iodide lamp illustrated in FIG. 1.

During lamp fabrication, discharge lamp 20 may be evacuated and provided with its operating atmosphere. For example, a typical mercury discharge lamp may be provided with a small amount of mercury and a partial filling of a starting gas such as argon. When a starting voltage is impressed on the lamp, argon is ionized by an auxiliary circuit (not shown). Thereafter, the mercury begins to vaporize and an arc strikes across the gap between electrodes 21 and 22 as shown by the dashed line between the electrode tips.

It is common practice to characterize the physical properties of a glass with reference to the viscosity-temperature curve of the glass. For convenience, specific points on such a curve, which identify the temperatures corresponding to specific viscosities, have been designated as the strain point, the annealing point, and the softening point of a glass. However, to fully describe the characteristics of a glass, the entire viscosity curve should be taken into consideration.

Typically, the viscosity of a glass decreases as the temperature increases and eventually reaches a zone or area in which the glass is soft and fluid and which is commonly known as the melting zone or area. Below this lies a zone or area within which the glass is less fluid, but can still be deformed under external forces. This is known as the working or sealing zone. At still lower temperatures, the glass becomes sufficiently rigid so that it will withstand considerable pressure without deforming or yielding. These various zones merge into one another and are not sharply defined. Nevertheless, they generally correspond to the glass melting zone, the lamp working or sealing zone, and the lamp operating zone for lamp glasses.

Figure 3:
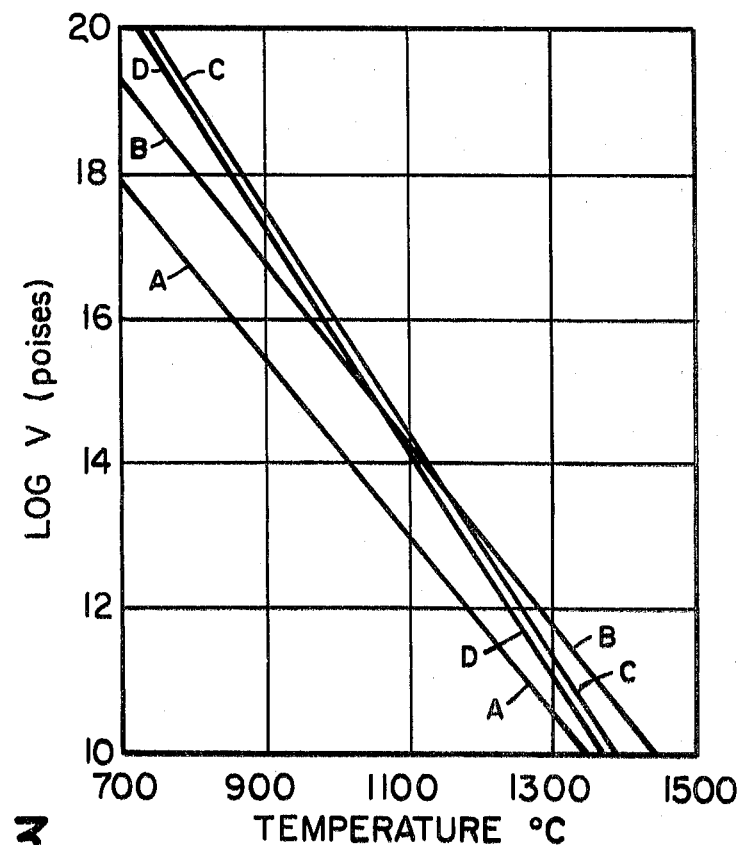
FIG. 3 is a graphic illustration of the viscosity-temperature relationship for several selected glasses.

FIG. 3 is a graphical illustration in which glass viscosity values, in poises, are plotted along the vertical axis as the logarithms of such viscosity values and designated Log V (poises), while temperatures, in degrees Centigrade (°C.), are plotted along the horizontal axis. Each of the four curves in FIG. 3 characterizes the log viscosity-temperature relationship for a different glass.

Curve A in FIG. 3 represents the viscosity-temperature relationship for a "dry", undoped, fused silica glass, that is a glass composed of 100% $SiO_2$. This is a glass prepared by the flame hydrolysis technique wherein silicon tetrachloride ($SiCl_4$) vapors are passed into a hot flame in a combustion burner and the silica particles thus formed are deposited and subsequently vitrified. Curve B illustrates the corresponding viscosity-temperature relationship for a fused quartz glass presently used in producing envelopes for commercial lamps such as illustrated in FIGS. 1 and 2. Curves C and D represent corresponding viscosity-temperature relationships for two "dry" fused silica glasses that are doped in accordance with the present invention.

The compositions of these glasses (designated by letter as in the drawing) are set forth in the table below on an oxide basis in both cationic mole and weight percent. The table also sets forth the temperatures corresponding to several selected points on the temperature-viscosity curve for each glass. These points are the glass annealing temperature ($T_a$) corresponding to a viscosity of $10^{13}$ poises (Log V = 13); the glass strain point ($T_s$) corresponding to $10^{14.5}$ poises; a temperature ($T_{900}$) corresponding to a viscosity of $10^{16.5}$ poises; and a temperature ($T_{800}$) corresponding to $10^{18}$ poises. The latter two points are arbitrarily chosen for comparison purposes and represent the viscosities of the commercial glass B at 900° and 800°C., respectively. For certain lamp uses, these temperatures are considered to be maximum use temperature limits with this prior glass.

TABLE I

|  | A | B | C | D |
|---|---|---|---|---|
| | | Cation Mole % | | |
| $SiO_2$ | 100 | 100 | 99.975 | 99.55 |
| $MoO_3$ | — | — | 0.025 | — |
| $TaO_{2.5}$ | — | — | — | 0.45 |
| | | Weight % | | |
| $SiO_2$ | 100 | 100 | 99.940 | 98.36 |
| $MoO_3$ | — | — | 0.060 | — |
| $Ta_2O_5$ | — | — | — | 1.64 |
| | | Properties | | |

TABLE I-Continued

|  | A | B | C | D |
|---|---|---|---|---|
| $T_s$ | 962 | 1070 | 1087 | 1070 |
| $T_a$ | 1089 | 1180 | 1184 | 1174 |
| $T_{800}$ | 680 | 800 | 865 | 855 |
| $T_{900}$ | 790 | 900 | 950 | 940 |

It will be observed that glass D, a fused silica glass doped with $Ta_2O_5$, has the same strain point temperature as does the present commercial fused quartz (B), while glass C, the $MoO_3$ doped silica, has a strain point almost 20°C. higher. In constrast, viscosities occurring in glasses C and D within the range of 1250° to 1300°C. correspond to viscosities in glass B within a temperature range that is 20°C. higher. This crossing of the viscosity-temperature curves of the glasses above the service temperature illustrates the characteristics steepness of the viscosity-temperature curve for each of the present envelope glasses.

In terms of lamp use or operating temperatures, this means that envelopes molded from the present glasses provide a higher operating temperature and/or lower glass melting and lamp working temperatures in comparison with the previously used fused quartz. This is shown more clearly by the $T_{900}$ and $T_{800}$ values. Thus, if the maximum operating temperature of a fuxed quartz envelope lamp was 900°C., glass C provides a comparable viscosity (and hence maximum use temperature) at 950°C. Likewise a prior maximum service temperature of 800°C. is now extended to 865°C. with glass C.

Figure 4:
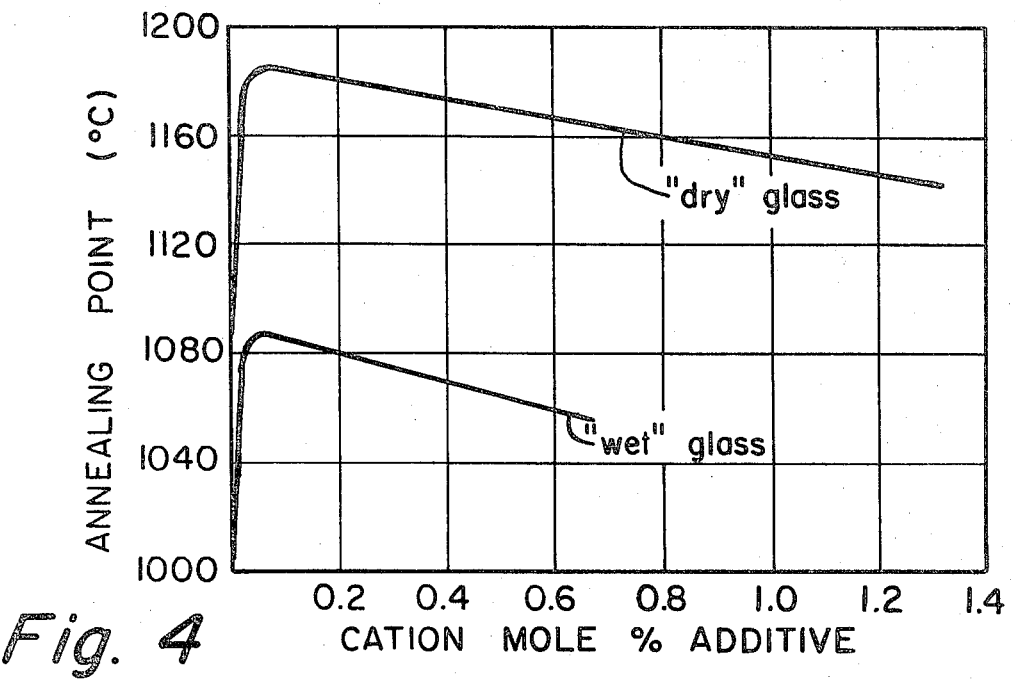
FIG. 4 is a graphic illustration of glass annealing temperature as a function of amount of oxide additive in accordance with the invention.

It will be understood that the viscosity-temperature values shown from the "dry" fused silica glasses in TABLE I would be substantially lower if the glasses were prepared by the alternate "wet" method, that is by direct deposition from the flame in the vitreous state. The relationship is shown in FIG. 4 which is graphic illustration wherein glass annealing point in degrees C. (°C.) is plotted along the vertical axis while oxide additive content, in cation mole percent, is plotted along the horizontal axis.

In this FIGURE, the upper curve shows glass annealing point as a function of increasing oxide additive in a "dry" fused silica glass in accordance with the present invention. Experimental data demonstrate that corresponding amounts (in cationic mole percent) of the different oxide additives that are effective for purposes of the present invention have essentially the same effect on the glass viscosity curve as exemplified by the annealing point. Thus, within the limits of experimental error, a given amount (in cationic mole percent) of any one of the effective oxides will raise the annealing point of fused silica a corresponding amount. Accordingly, a single curve in FIG. 4 represents each of the six effective oxide additives.

The lower curve in FIG. 4 represents the effect on annealing point of adding an effective oxide to a "wet" fused silica. It is readily apparent that the effect is essentially identical, the difference in position on the graph, and hence difference in annealing points being occasioned by the water or hydroxyl ion in the glass. Thus, there is approximately a hundred degrees difference between the annealing points of corresponding "wet" (beta value of 0.78) and "dry" (beta value of 0.03 or less) fused silica glasses.

FIG. 4 shows that, in either "wet" or "dry" glass the annealing point temperature rises very rapidly with the first few hundredths of a cation mole percent additive. At about 0.05 percent, it levels off and then starts to drop gradually so that the optimum amount of additive for each oxide is in the range of 0.01–1.0 cation mole percent, preferably up to 0.4 cation mole percent.

The envelope glasses of the present invention invention have a relatively strong resistance to devitrification. This is particularly important because the life of a high temperature lamp is frequently ended by a fracture initiated by a devitrification spot occurring on the lamp envelope. As reported by Elmer and Nordberg in The Journal of the Americal Ceramic Society, Vol. 50, No. 6, June, 1967, pp. 275–279, this tendency of silica glasses to undergo devtrification has been studied by an accelerated test wherein a strip of the glass is supported in contact with conductors attached to a source of direct current. A dc potential of 300 volts is then placed across the glass while it is held at a temperature of 900°C. for a period of three days. At the end of this time, a devitrification, or crystallization spot commonly develops on the glass surface near the contact with the negative conductor. The devitrification spot has an inner core composed of dense crystallization, and an outer annulus that has a crazed appearance. The devitrification tendency of a glass may be measured in terms of the size of either the dense inner core of crystallization, or in terms of the total affected area.

Measurements of this nature demonstrate that fused silica envelopes in accordance with the present invention provides a substantial improvement in devitrification resistance when compared with fused quartz envelopes now used in high temperature lamps.

Figure 5:
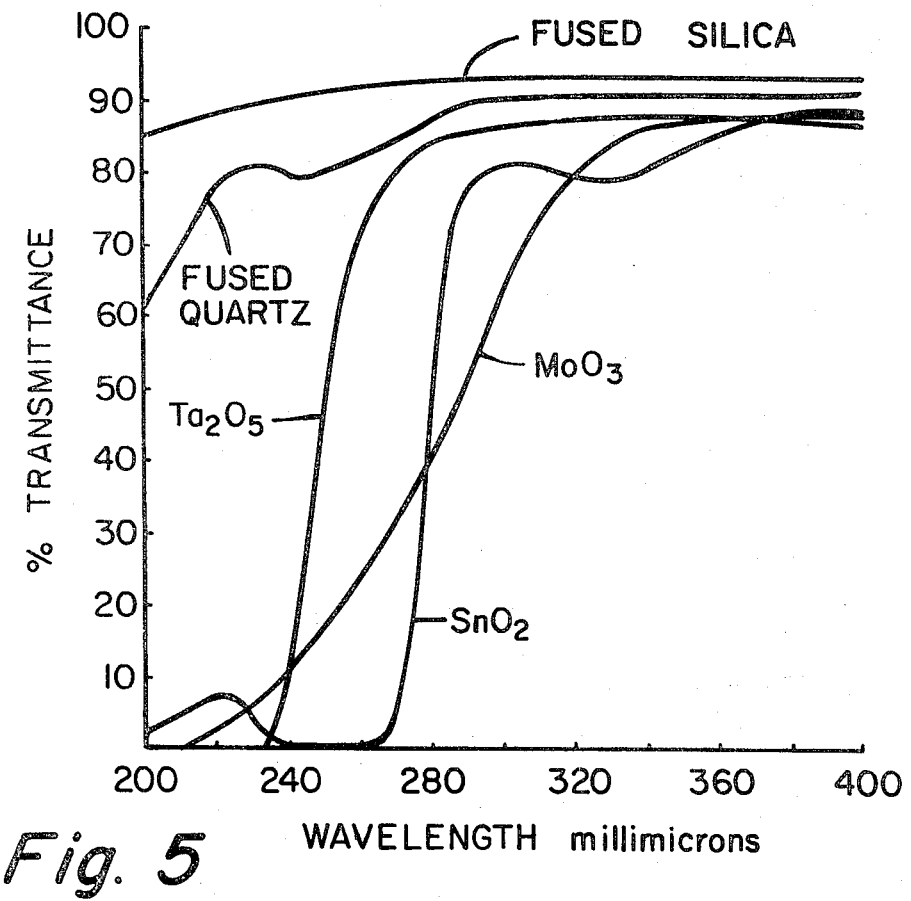
FIG. 5 is a graphic illustration of radiation transmission as a function of wavelength.

The manner in which the present glass envelopes can enhance lamp efficiency may be seen in FIG. 5. This FIGURE is a graphical illustration of radiation transmission wherein wavelength of the transmitted radiation is plotted on the horizontal axis and percent transmittance is plotted on the vertical axis. The curves labeled "Fused Silica" and "Fused Quartz" are based on spectrophotometric measurements made on 2 mm. thick sheets of Glasses A and B in TABLE I. The remaining curves are based on corresponding measurements made on fused silica doped in accordance with the present invention. The curve labeled "$Ta_2O_5$" is based on a fused silica glass containing 0.60 cation mole % $TaO_{2.5}$ as dopant; that labeled "$MoO_3$" is based on a fused silica glass with 0.025 cation mole % $MoO_3$; that labeled "$SnO_2$" is based on a fused silica with 0.028 cation mole % $SnO_2$ as dopant.

Absorption (the converse of transmittance) of radiation over 200 millimicrons in length is relatively insignificant in either fused quartz or pure fused silica glasses. Thus, ultraviolet radiation generated in a lamp with such an envelope will be transmitted as such. In contrast, the doped fused silicas ($SnO_2$, $MoO_3$ and $Ta_2O_5$) absorb almost completely below about 250 millimicrons. This not only removes unwanted ultraviolet, but also enhances visible transmission because the absorbed radiation is subsequently reemitted as secondary radiation in accordance with well-known principles of fluorescence.

I claim:

1. An electric lamp capable of operation at a temperature of 800°–1150°C. under an internal pressure of up to 100 atmospheres comprising a light source within a glass envelope, said glass envelope being colorless and ultraviolet absorbing and consisting essentially of a high purity fused silica glass containing, as an additive to its composition on a cation mole percent basis, 0.01–1.0% of an oxide selected from the group consisting of $SnO_2$, $GeO_2$, $Fe_2O_3$, $WO_3$, $MoO_3$, and $Ta_2O_5$.

2. A high temperature electric lamp in accordance with claim 1 wherein the amount of oxide additive in the lamp envelope glass does not exceed 0.4 cation mole percent.

3. A high temperature electric lamp in accordance with claim 1 wherein the glass envelope is composed of a "dry" fused silica having a relatively low hydroxyl ion content as expressed by a beta content below 0.10.

* * * * *